US006813354B1

(12) United States Patent
Jakobsson et al.

(10) Patent No.: US 6,813,354 B1
(45) Date of Patent: Nov. 2, 2004

(54) MIXING IN SMALL BATCHES

(75) Inventors: Bjorn Markus Jakobsson, Hoboken, NJ (US); Ari Juels, Cambridge, MA (US)

(73) Assignees: Lucent Technologies Inc., Murray Hill, NJ (US); RSA Security Inc., Bedford, MA (US)

(*) Notice: Subject to any disclaimer, the term of this patent is extended or adjusted under 35 U.S.C. 154(b) by 0 days.

(21) Appl. No.: 09/521,681

(22) Filed: Mar. 9, 2000

(51) Int. Cl.$^7$ .............................. H04L 9/18; G09C 3/04
(52) U.S. Cl. .............................. 380/37; 705/12; 235/58
(58) Field of Search ...................................... 708/12, 50

(56) References Cited

U.S. PATENT DOCUMENTS

| | | | | |
|---|---|---|---|---|
| 3,962,539 A | * | 6/1976 | Ehrsam et al. ................. | 380/29 |
| 5,120,939 A | * | 6/1992 | Claus et al. ................. | 235/382 |
| 5,214,703 A | * | 5/1993 | Massey et al. ................. | 380/37 |
| 5,625,695 A | * | 4/1997 | M'Raihi et al. ............... | 380/28 |
| 6,009,176 A | * | 12/1999 | Gennaro et al. ............ | 713/170 |
| 6,182,216 B1 | * | 1/2001 | Luyster ....................... | 713/168 |
| 6,389,538 B1 | * | 5/2002 | Gruse et al. ................. | 713/194 |
| 6,598,163 B1 | * | 7/2003 | Jakobsson .................... | 713/176 |

OTHER PUBLICATIONS

Kaist Al Fuzzy, Kwangsu Lee, "Construction of Pseudo–Random Permutation using Unbalanced Feistel Network", Jul. 29, 1999, http://monami.kaist.ac.kr/~guspin/seminar/prp_ufn/.*
Michael Luby, Charles Rackoff, Pseudo–random Permutation Generators and Cryptographic Composition, 1986, ACM.*
Mihir Bellare, Ted Krovetz, Phillip Rogaway, Luby–Rackoff Backwards: Increasing Security by Making Block Ciphers Non–Inverticable, Oct. 17, 1998, Advances in Cryptology—Eurocrypt 98 Proceedings.*

(List continued on next page.)

Primary Examiner—Gregory Morse
Assistant Examiner—Mossadeq Zia

(57) ABSTRACT

A highly efficient mix network for small numbers of inputs is provided. Four data messages would be a typical number of inputs. The structure of sorting/permutation networks is used to permute the input. This is done in a way that changes the position of pairs of items. A mix network is provided which is highly efficient on small input batches and is robust and private in the face of collusion by any minority set of mix servers. Additionally, the mix network method and apparatus has the feature of being publicly verifiable because the mixing method yields a transcript of results that can demonstrate to a third party that the mix proceeded correctly. An apparatus comprised of a plurality of mix servers is provided. Each mix server includes a randomizer network. Each randomizer network receives a plurality of input data messages and performs re-encryption and permutation operations on the plurality of input data messages to form a plurality of output data messages. The randomizer networks of the plurality of mix servers are arranged in a chain so that the first randomizer network of the first mix server in the chain receives its plurality of input data messages and provides its plurality of output data messages to the next randomizer network of the following mix server in the chain. Each randomizer network is comprised of a plurality of randomizers, wherein each randomizer receives first and second input data messages and produces first and second output data messages, wherein the first output data message is a re-encryption of either the first or the second input data message and the second output data message is a re-encryption of the other input data message. A bulletin board having computer memory may be provided, to which each mix server produces proof that each randomizer of each randomizer network has re-encrypted and permuted in a proper manner.

19 Claims, 6 Drawing Sheets

OTHER PUBLICATIONS

Masayuki, Abe, "University Verifiable Mix–net with Verification Work Independent of the Number if Mix–servers", 1998, Advances in Cyptology—EUROCRYPT'98, LNCS 1403, pp. 437–447.*

Menezes, Alfred J., Handbook of Appied Cryptogrpahy, 1197, CRC Press, p. 250–251, 263, 408–411, 459.*

Chaum, David, "Untraceable Electronic Mail, Return Addresses, and Digital Pseudonyms", Feb. 1981, Communication of the ACM, vol. 24, No. 2.*

Goldschlag, David, "Onion Routing for Anonymous and Private Internet Connections", Jan., 28, 1999, Center for High Assurance Computer Systems.*

Jakobsson, Markus, "A Practical Mix", 1998, Advances in Crptology—EUROCRYPT'98, LNCS 1403, pp. 448–461.*

Reiter, Michael, "Crowds, Anonymity for Web Transactions", Nov. 1998, ACM Transaction on Informatin and System Security, vol. 1, No. 1, pp. 66–92.*

* cited by examiner

Randomizer Network Mix Server 1

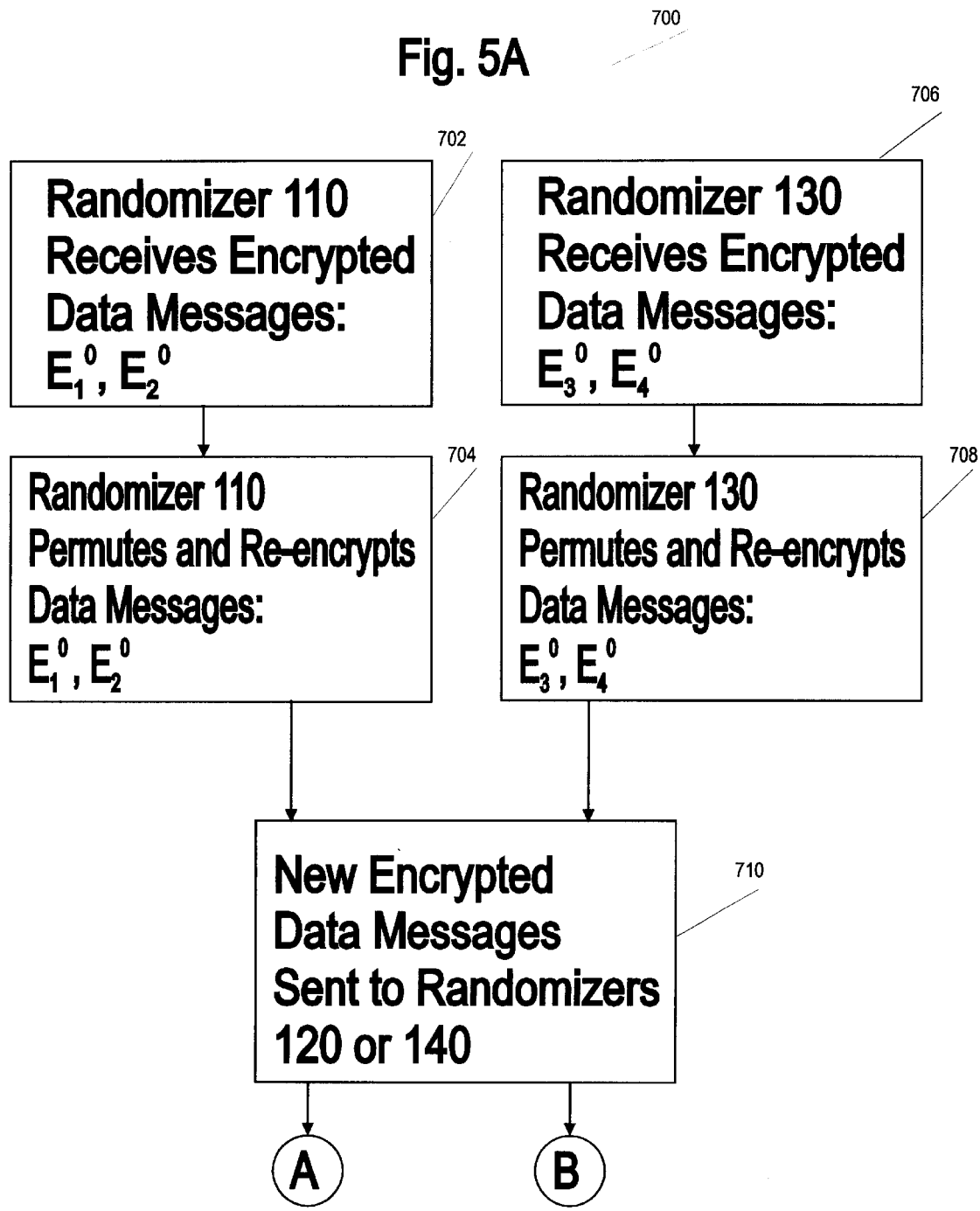

MIXING IN SMALL BATCHES

FIELD OF THE INVENTION

This invention relates to improved methods and apparatus for providing mix networks.

BACKGROUND OF THE INVENTION

A mix network is a privacy primitive used to reorder a list of inputs, thereby producing a list of outputs, so that the items of the output correspond to the items of the inputs, but in a way that the relative order cannot be determined. There are essentially three types of mix networks: (1) Those in which the receiver of the output needs to trust that the output is of the right form (i.e. corresponds to the input); (2) Those in which the receiver needs to trust that one of the servers producing the output is honest—if that is so, then the output must be correct; and (3) Those in which the receiver can verify the correctness of the output, and does not need to trust anybody. Schemes of the first type are not very useful. Schemes of the second type are useful for most applications, and there exist efficient solutions for these, especially when the input sizes are large. For certain applications a scheme of the third type is preferred. There may be some recent proposals of how to do schemes of the third type. However, these recently proposed schemes are not as efficient as the methods disclosed in the present application. In addition, the applicant claims priority over some of the other most recently proposed methods and these may or may not be prior art. For the most part these proposed methods do not handle small inputs Generally, a mix network takes a collection of n encrypted input data messages (each message including a plurality of data bits or data signals), re-encrypts them, and outputs them in an unrevealed, randomly permuted order. The original conception of mix networks is by Chaum. They have been used or proposed for use for anonymous e-mail, Web browsing, and secure elections, as well as for seemingly unrelated applications such as anonymous payments systems and secure multi-party computation.

In recent years threshold mix networks have been proposed which employ multiple mix servers where the correctness and privacy of the mix is robust against malicious coalitions of mix servers. However, most prior art multiple mix server techniques are inefficient, often requiring between fifty up to more than a thousand exponentiation operations. One prior art mix network proposed by Jakobsson brought the number of exponentiations down to one per input item (each item is a single message comprised of multiple data bits or data signals) but this prior art mix network assumed very large input batches (of about 1 million items).

SUMMARY OF THE INVENTION

The present invention provides the first highly efficient mix network for small numbers of inputs. Four data messages (each message comprised of multiple data bits or signals) would be a typical number of inputs. The solution, which is based on techniques used to sort data (but which in embodiments of the present invention are used to unsort data) allows a receiver to verify the correctness of the output.

The present invention uses the structure of sorting/permutation networks to permute the input. This is done in a way that changes the position of pairs of items (iteratively or in parallel), which allows efficient proofs to be employed for proving correctness (it is known that proofs become significantly more expensive as they become bigger, and in embodiment of the present invention, we break down the proofs in their smallest components, i.e., to prove statements about pairs of items instead of vectors). We develop novel methods relating to signature schemes to realize these proofs.

Embodiments of the present invention provide a mix network method and apparatus which is highly efficient on small input batches and is robust and private in the face of collusion by any minority set of mix servers. Additionally, the mix network method and apparatus has the feature of being publicly verifiable because the mixing method yields a transcript of results that can demonstrate to a third party that the mix proceeded correctly.

In one embodiment of the present invention an apparatus comprised of a plurality of mix servers is provided. Each mix server includes a randomizer network. Each randomizer network receives a plurality of input data messages and performs re-encryption and permutation operations on the plurality of input data messages to form a plurality of output data messages. The randomizer networks of the plurality of mix servers are arranged in a chain so that the first randomizer network of the first mix server in the chain receives its plurality of input data messages and provides its plurality of output data messages to the next randomizer network of the following mix server in the chain. Each randomizer network is comprised of a plurality of randomizers, wherein each randomizer receives first and second input data messages and produces first and second output data messages, wherein the first output data message is a re-encryption of either the first or the second input data message and the second output data message is a re-encryption of the other input data message. The apparatus may be further comprised of a bulletin board having computer memory. Each mix server produces proof to the bulletin board that each randomizer of each randomizer network has re-encrypted and permuted in a proper manner.

The re-encryption step may be replaced by decryption at one or more steps.

BRIEF DESCRIPTION OF THE DRAWINGS

FIGS. 5A and 5B shows a flow chart in accordance with a method of the present invention.

DETAILED DESCRIPTION OF THE DRAWINGS

Figure 1:
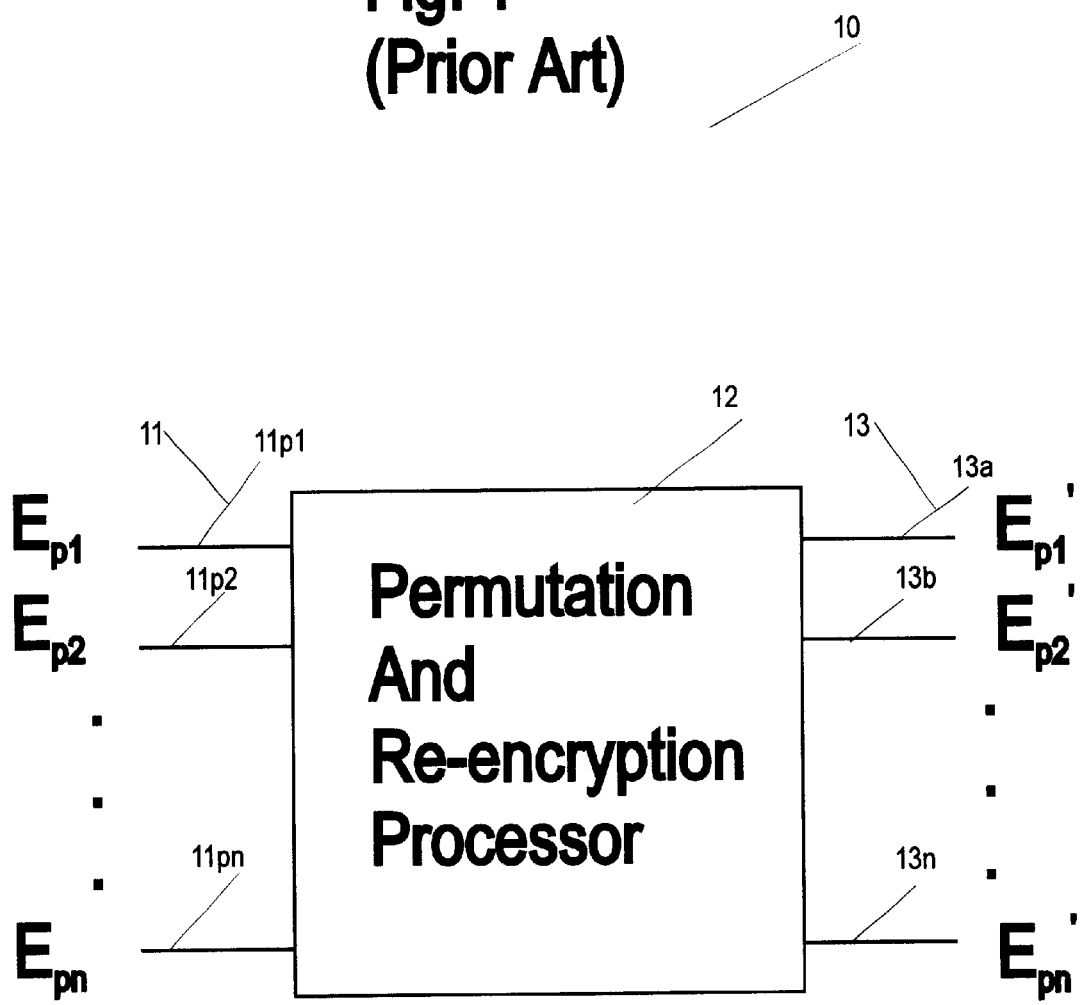
FIG. 1 shows a diagram of a prior art technique for permutation and re-encryption.

FIG. 1 shows a diagram 10 of a prior art technique for permutation and re-encryption. The diagram 10 shows a processor 12 which can be a personal computer which runs computer software to implement its functions. The processor 12 receives a plurality of encrypted data messages (each of which may be comprised of a plurality of data bits or data signals) at its input port 11. Its input port 11 may be comprised of a plurality of input lines such as $11_{p1}$, $11_{p2}, \ldots 11_{pn}$ where n is some integer greater than or equal to two. The plurality of encrypted data messages may include encrypted data messages $E_{p1}, E_{p2}, \ldots E_{pn}$, where n is again greater than or equal to two. $E_{p1}$ is input to the processor 12 on line $11_{p1}$, $E_{p2}$ is input to the processor 12 on line $11_{p2}$ and $E_{pn}$ is input to the processor 12 on line $11_{pn}$, and any further number of encrypted data messages are input on corresponding data lines. The processor 12 permutes and re-encrypts the encrypted data messages $E_{p1}, E_{p2} \ldots E_{pn}$ to form the encrypted data messages $E_{p1}', E_{p2}', \ldots E_{pn}'$ at the corresponding output lines 13a, 13b, and 13n at output port 13. The processor 12 may have internal memory which stores both the input encrypted data messages $E_{p1}$ through $E_{pn}$ and the output encrypted data messages $E_{p1}'$ through $E_{pn}'$.

An embodiment of the present invention will be described with reference to FIGS. 2 through 5A–B. FIG. 3 shows a mix network which is referred to as a randomizer network chain 600. Although the network chain 600 shows randomizer networks 100, 200, and 300, it should be noted that any further number of randomizer networks utilizing the properties of the present invention can be employed. The network chain 600 takes a sequence of ciphertext messages, such as El Gamal encrypted ciphertext data messages, $E_1^0$, $E_2^0$, $E_3^0$, and $E_4^0$ and produces an output at the end of network chain 600 of $E_1^3$, $E_2^3$, $E_3^3$, and $E_4^3$, $E_1^3$, $E_2^3$, $E_3^3$, and $E_4^3$ is produced after a series of random and secret permutations and a series of re-encryptions as will be described further below.

Figure 2:
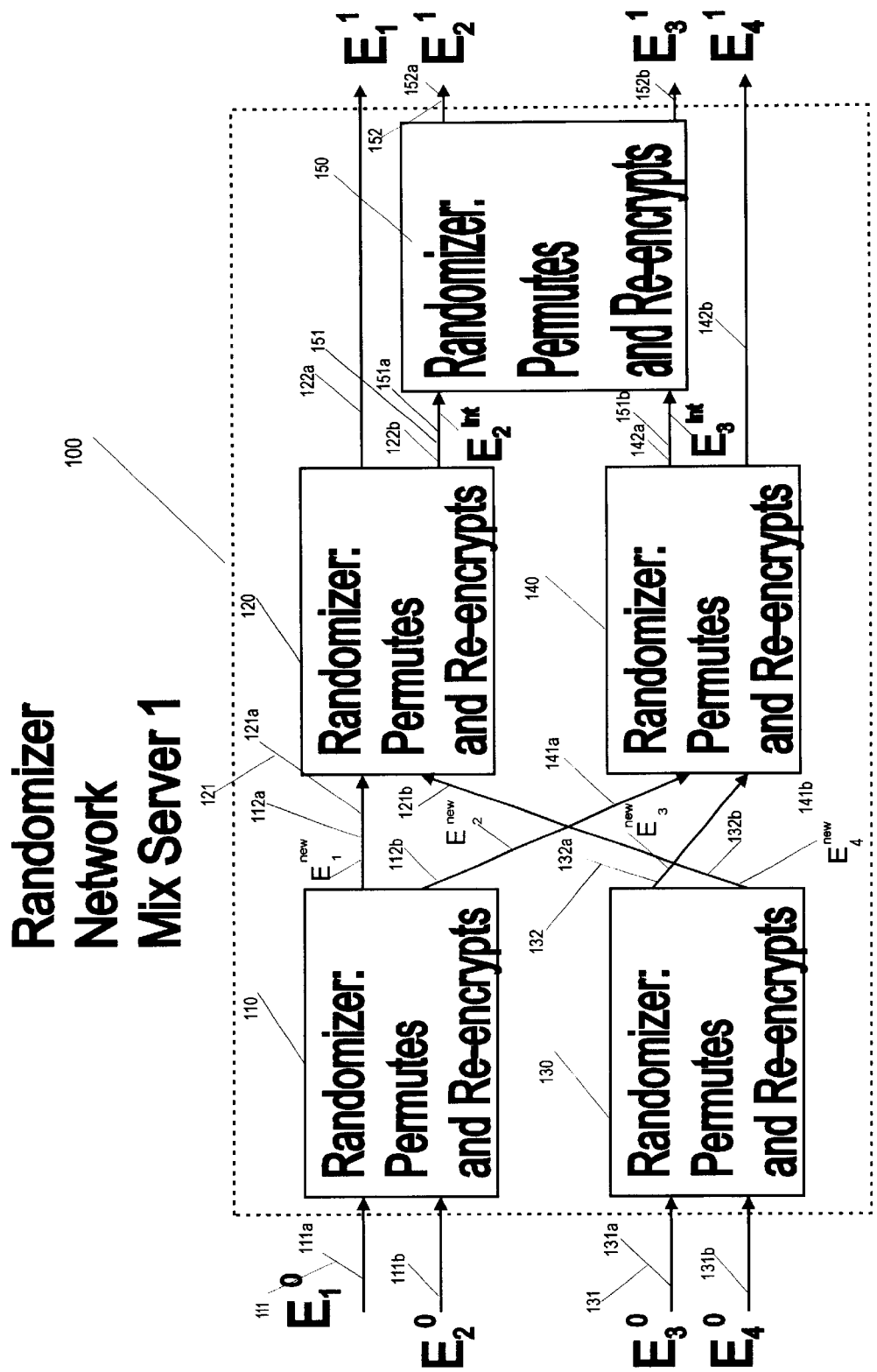
FIG. 2 shows a diagram of a randomizer network of a first mix server for use in an embodiment of the present invention.
Figure 3:
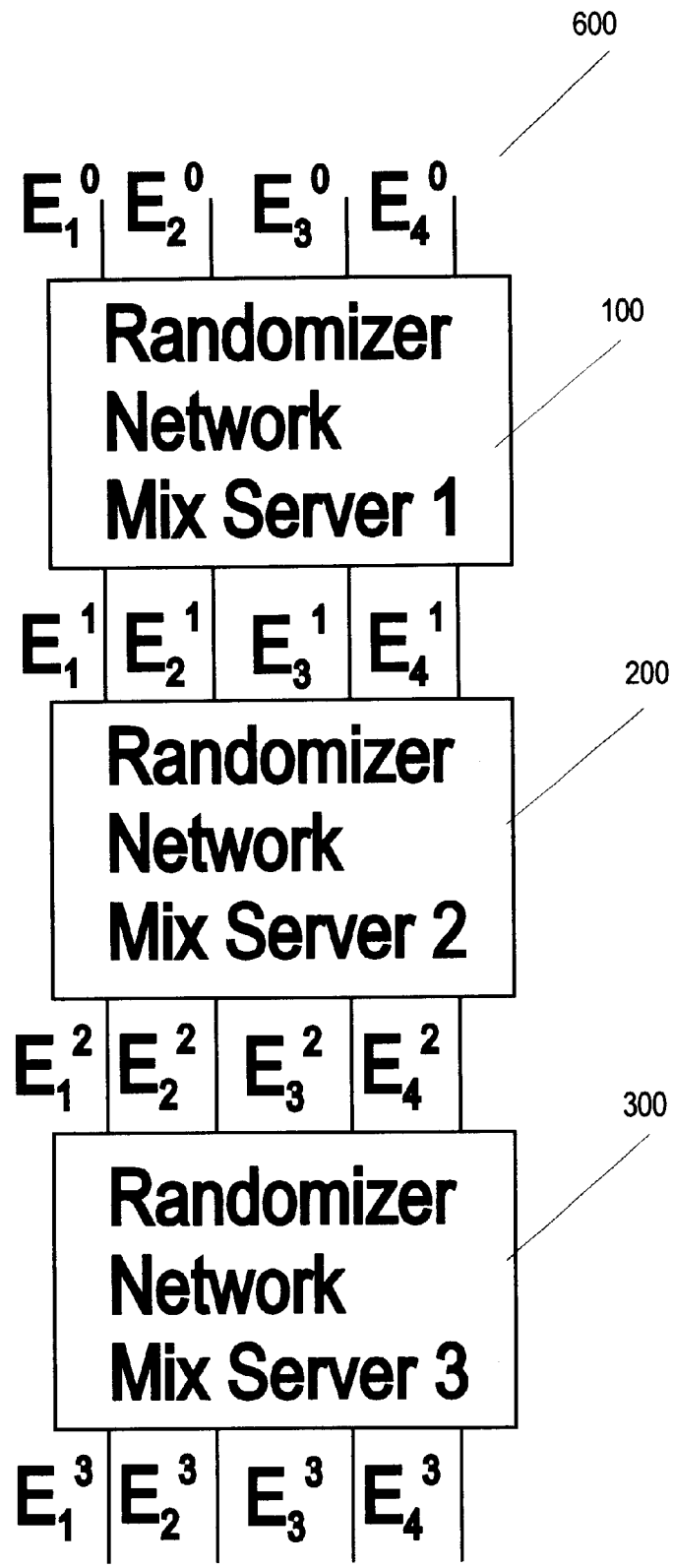
FIG. 3 shows a diagram of a mix network comprised of a plurality of randomizer networks of a corresponding plurality of mix servers in accordance with an embodiment of the present invention.

FIG. 2 shows a randomizer network 100 of a first mix server for use in an embodiment of the present invention. The randomizer network 100 includes randomizers 110, 120, 130, 140, and 150. Each randomizer of the randomizers 110, 120, 130, and 140 has an input port and an output port. Each input port is comprised of two lines and each output port is comprised of two lines. The randomizer 110 is comprised of input port 111 which is comprised of input lines 111a and 111b, and an output port 112 which is comprised of output lines 112a and 112b. Similarly the randomizers 120, 130, 140, and 150 are comprised of input ports 121, 131, 141, and 151 and output ports 122, 132, 142, and 152 respectively. Input port 121 is comprised of input lines 121a–b, input port 131 is comprised of input lines 131a–b, input port 141 is comprised of input lines 141a–b, and input port 151 is comprised of input lines 151a–b. Output port 122 is comprised of output lines 122a–b, input port 132 is comprised of output lines 132a–b, output port 142 is comprised of output lines 142a–b, and output port 152 is comprised of output lines 152a–b.

Figure 5B:
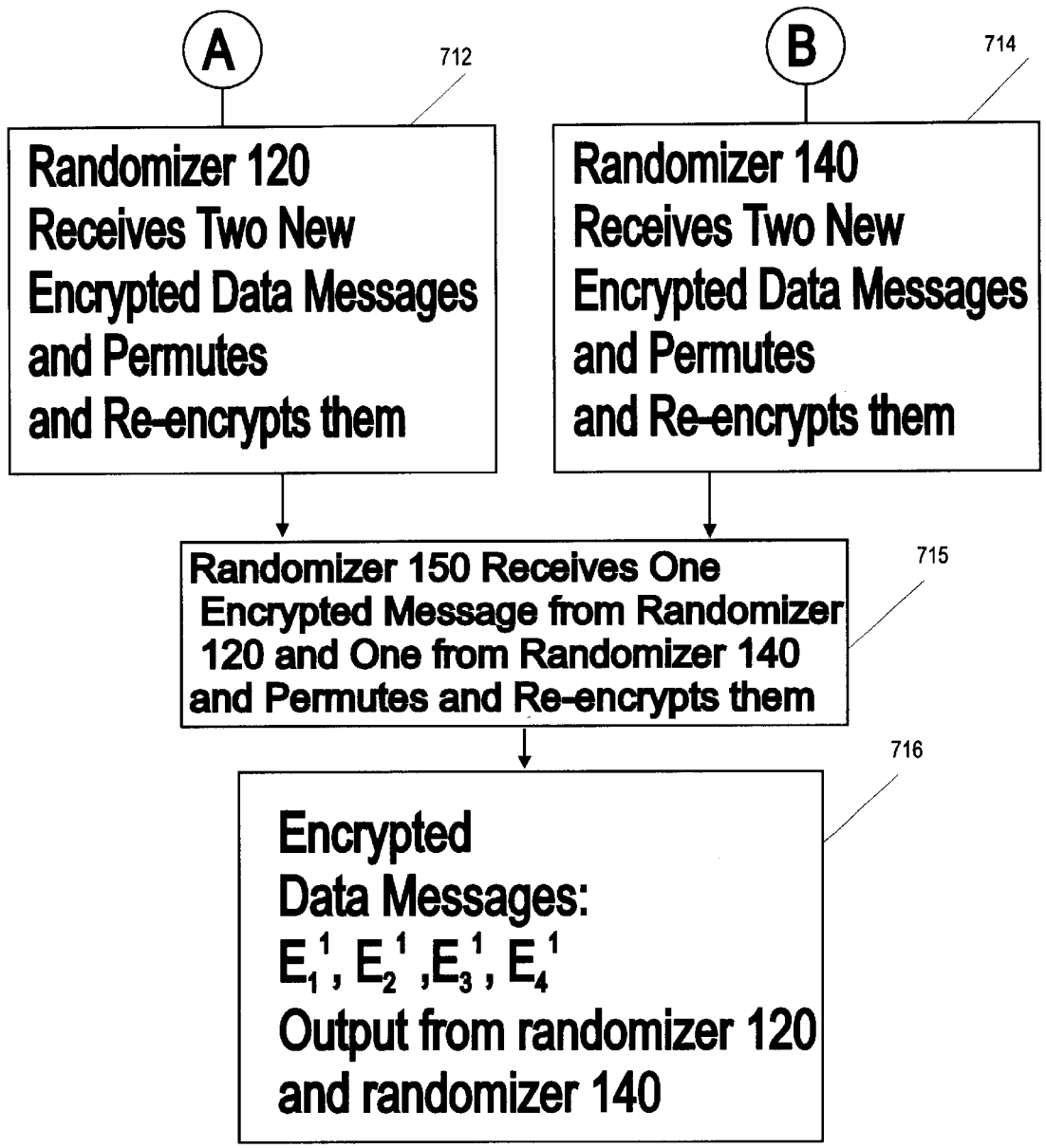

The randomizer network 100 in FIG. 2 operates as shown by the flow chart 700 in FIGS. 5A and 5B. At step 702 the randomizer 110 receives the encrypted data messages $E_1^0$ and $E_2^0$ on its input lines 111a and 111b respectively. The randomizer 110 may store the encrypted data messages $E_1^0$ and $E_2^0$ in memory in the randomizer 110. The randomizer 110 (and randomizers 120, 130, 140, and 150) can be a personal computer whose functions are implemented with computer software (or all of the randomizers 110, 120, 130, 140, and 150 may be part of the same computer). At step 704, the randomizer 110 re-encrypts the encrypted data messages $E_1^0$ and $E_2^0$ and permutes them to provide new encrypted data messages on each of output lines 112a and 112b. These new encrypted data messages may be stored in randomizer 110.

Permuting in the case of two inputs and two outputs as for randomizer 110 in FIG. 2 means to either provide the two output data messages in the same order at the output as their corresponding input data messages or to send them in the opposite order (i.e. switched). For example, for outputs to be provided in the same order as inputs, the new encrypted data message corresponding to $E_1^0$ would appear on output line 112a and the new encrypted data message corresponding to $E_2^0$ would appear on output line 112b. For outputs to be provided in the reverse order as inputs, the new encrypted data message corresponding to $E_1^0$ would appear on output line 112b and the new encrypted data message corresponding to $E_2^0$ would appear on output line 112a. Because re-encryption is used by the randomizers, such as randomizer 110, it cannot be determined by a third party computer or individual whether the outputs have been provided in the same order or the reverse order of their corresponding inputs.

While the randomizer 110 is receiving encrypted data messages $E_1^0$ and $E_2^0$, the randomizer 130 may be receiving encrypted data messages $E_3^0$ and $E_4^0$ at step 706, on its input lines 131a and 131b respectively. The randomizer 130 may store the encrypted data messages $E_3^0$ and $E_4^0$ in memory in the randomizer 130. At step 708, the randomizer 130 re-encrypts the encrypted data messages $E_3^0$ and $E_4^0$ and permutes them to provide new encrypted data messages on each of output lines 132a and 132b. These new encrypted data messages may be stored in randomizer 130.

At step 710 the new encrypted data messages on output lines 112a, 112b, 132a, and 132b are sent to input lines 121a (of randomizer 120), 141a (of randomizer 140), 141b (of randomizer 140), and 121b (of randomizer 120), respectively. At step 712, the randomizer 120 takes the new encrypted data messages it receives on lines 121a and 121b and permutes and re-encrypts them to form encrypted data messages $E_1^1$ and $E_2^{int}$ on output lines 122a and 122b, respectively. At the same time, at step 714, the randomizer 140 takes the new encrypted data messages it receives on input lines 141a and 141b and permutes and re-encrypts them to form encrypted data messages $E_3^{int}$ and $E_4^1$ on output lines 142a and 142b, respectively.

At step 715, the interim encrypted data message $E_2^{int}$ from output line 122b of randomizer 120 is supplied to input line 151a of randomizer 150. Also, the interim encrypted data message $E_3^{int}$ from output line 142a is supplied to input line 151b of randomizer 150. Randomizer 150 permutes and re-encrypts the inputs $E_2^{int}$ and $E_3^{int}$ to form encrypted data messages $E_2^1$ and $E_3^1$ on the output lines 152a and 152b, respectively.

Step 716 is the output of the final encrypted data messages $E_1^1$ and $E_2^1$, $E_3^1$ and $E_4^1$.

The randomizer network 100 in FIG. 2, thus, as a whole, receives a plurality of encrypted data messages at input lines 111a–b, and 131a–b (in this case $E_1^0, E_2^0, E_3^0,$ and $E_4^0$) and produces a re-encrypted and permuted plurality of data messages at its output lines 122a, 152a, 152b, and 142b ($E_1^1, E_2^1, E_3^1$ and $E_4^1$). Each of the randomizers 110, 120, 130, 140, and 150 also stores in its own respective memory the factors used to do the permutation and re-encryption. Each of the randomizers 110, 120, 130, 140, and 150 uses a zero-knowledge proof to prove that the each of its outputs correspond to one of its inputs. For example, randomizer 110 proves to all other mix servers that that the new encrypted data message on line 112a was derived from one of the encrypted data messages $E_1^0$ or $E_2^0$ and that the encrypted data message on line 112b was derived from one of the encrypted data messages $E_1^0$ or $E_2^0$. The randomizers 120, 130, 140, and 150 do the same for their inputs and outputs.

As is well-known to the person skilled in the art, a zero-knowledge proof is a type of computation performed by at least one proffer and at least one verifier, in which the proffer(s) convince the verifier(s) that a given statement holds. This is done in a manner that allows the verifier(s) to be convinced that the given statement is indeed true, but they cannot deduce any other information, such as why it is true.

In embodiments of the present invention, the proof convinces the verifier(s) that the output items corresponds to the input items. More in particular, it says that for the randomizer 100 of FIG. 2, either the first output item (e.g. $E_1^{new}$) is a valid re-encryption of the first input item (e.g. $E_1^0$) and the second output item ($E_2^{new}$) is a valid re-encryption of the second input item (e.g. $E_2^0$); or the first output item (e.g. $E_1^{new}$) is a valid re-encryption of the second input item (e.g. $E_2^0$) and the second output item (e.g. $E_2^{new}$) is a valid re-encryption of the first input item (e.g. $E_1^0$).

A Schnorr signature (and related constructions) are non-interactive zero-knowledge proofs of knowledge of the signer's secret key. The present invention in some embodiments devises a derived version of a protocol like a Schnorr signature protocol, where by "signing" one proves that a valid re-encryption and permutation was performed, and by "verifying the signature" one verifies the same fact.

Figure 4:
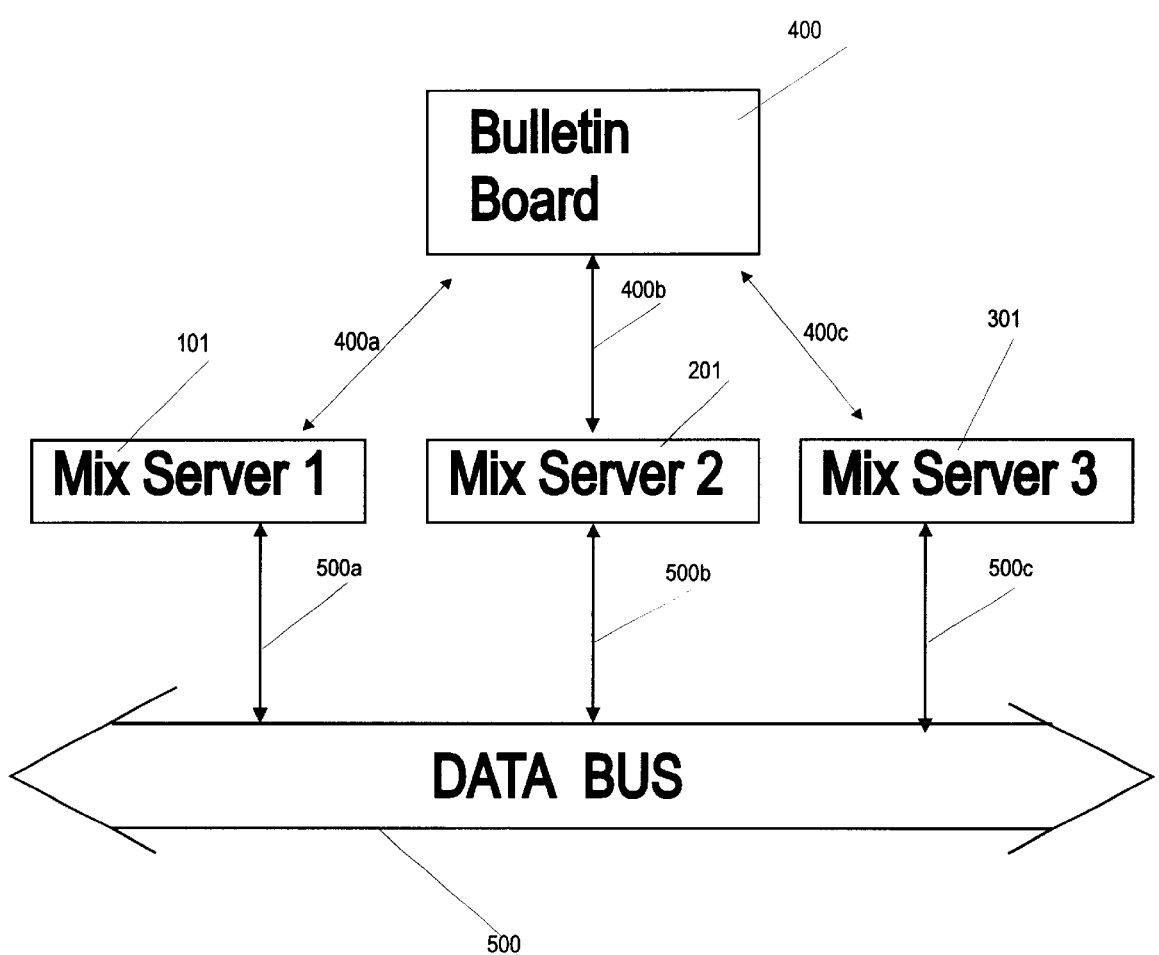
FIG. 4 shows an apparatus comprised of a bulletin board, and a plurality of mix servers connected by a data bus.

Mix servers 1, 2, and 3 are shown in FIG. 4 and labeled as 101, 201, and 301. Mix server 101 includes randomizer network 100 and mix servers 201 and 301 include randomizer networks 200 and 300, respectively, shown in FIG. 3. The mix servers 101, 201, and 301 are electrically connected by communications links 400a, 400b, and 400c, respectively to the bulletin board 400. The bulletin board 400 may also be a personal computer or may be implemented on a personal computer through computer software. The bulletin board 400 includes memory which is publicly shared and all mix servers 101, 201, and 301 have read access and appenditive, sequential write access. The bulletin board 400 may be simulated or replaced by a broadcast channel. The mix servers 101, 201, and 301 are also electrically connected to a data bus 500 by communications links 500a, 500b, and 500c, respectively.

The mix server 101 sends to the bulletin board 400 (via communications link 400a) the zero knowledge proofs for each of its randomizers 110, 120, 130, 140, and 150 in the randomizer network 100. The other mix servers 201 and 301 access the zero knowledge proofs via communications links 400b and 400c and each mix server verifies the zero knowledge proofs. Techniques for performing this will be described later.

If the mix servers 201 and 301 have verified that the mix server 101 has permuted and re-encrypted appropriately (without substituting phony data messages for example, or tampering with the data messages in some way), then next the randomizer network 200 of mix server 201 is used as shown by FIG. 3. As seen in FIG. 3 the encrypted data messages $E_1^1$, $E_2^1$, $E_3^1$, and $E_4^1$, from the output of randomizer network 100 are sent to the input of randomizer network 200. The randomizer network 200 functions in the same manner as the randomizer network 100 of the first mix server 101 except that different permutations and different re-encryption factors are used. The randomizer network 200 would also be comprised of five randomizers in this example.

The mix server 201 produces the same type of zero knowledge proofs as the first mix server 101 and supplies these proofs to the bulletin board 400 via communications link 400b. The first mix server 101 and third mix server 301 then verify that the second mix server 201 has permuted and re-encrypted properly (i.e. without substituting phony data messages or tampering with the data in some way).

If the mix servers 101 and 301 have verified that the mix server 201 has permuted and re-encrypted appropriately then next the randomizer network 300 of mix server 301 is used as shown in FIG. 3. As seen in FIG. 3 the encrypted data messages $E_1^2$, $E_2^2$, $E_3^2$, and $E_4$ from the output of randomizer network 200 are sent to the input of randomizer network 300. The randomizer network 300 functions in the same manner as the randomizer network 100 of the first mix server 101 except that different permutations and different re-encryption factors are used. The randomizer network 300 would also be comprised of four randomizers in this example.

The mix server 301 produces the same type of zero knowledge proofs as the first mix server 101 and supplies these proofs to the bulletin board 400 via communications link 400c. The first mix server 101 and the second mix server 201 then verify that the third mix server 301 has permuted and re-encrypted properly (i.e. without substituting phony data messages or tampering with the data in some way).

The randomizer network 300 of the mix server 301 produces encrypted data messages $E_1^3$, $E_2^3$, $E_3^3$, and $E_4^3$, each one of which corresponds to one of the original encrypted data messages $E_1^0$, $E_2^0$, $E_3^0$ and $E_4^0$.

If any of the mix servers of mix servers 100, 200, and 300 cheated (i.e. if they introduced phony data messages or tampered in some other way) that mix server can be taken out of randomizer network chain 600 shown in FIG. 3. For example if mix server 101 "cheated" then mix server 101 can be removed from chain 600 in FIG. 3, so that the original input encrypted data messages would be applied to the randomizer network 200 in the first instance and then only pass through randomizer network 300.

Any number of randomizer networks of the type shown in FIG. 2, can be added to the chain 600 of randomizer networks in FIG. 3. Each randomizer should have two inputs and two outputs as for randomizer 110 in FIG. 2, but a greater number of inputs and outputs can be provided. FIG. 2 shows four encrypted data messages $E_1^0$, $E_2^0$, $E_3^0$, and $E_4^0$, however any number of encrypted data messages can be provided.

The embodiment of the present invention is highly efficient for small numbers of data messages. In particular, the asymptotic complexity of our construction for an n-item mix is proportional to n log $^2$n, in contrast to being proportional to n for other mixes. In addition, the constant per-item costs for embodiments of the present invention, are very low by comparison to prior art mix networks for small n.

The randomizer network chain 600 can be invoked when some pre-determined triggering event occurs, such as when a previously agreed upon number of messages has accumulated. For example when four encrypted data messages have accumulated on the bulletin board 400 such as $E_1^0$, $E_2^0$, $E_3^0$, and $E_4^0$) the randomizer network chain 600 can then begin its operation.

After the output $E_1^3$, $E_2^3$, $E_3^3$, and $E_4^3$ is obtained it can be posted to the bulletin board 400. The mix servers of 101, 201, and 301 may also post intermediate results to the bulletin board (such as $E_1^1$, $E_2^1$, $E_3^1$, and $E_4^1$ and $E_1^2$, $E_2^2$, $E_3^2$, and $E_4^2$).

Note that the encrypted ciphertext data messages $E_1^0$, $E_2^0$, $E_3^0$, and $E_4^0$ may be replaced by plaintext messages. Inputs to the bulletin board 400 and thus to the randomizer network chain 600 may be plaintexts rather than ciphertexts. Alternatively inputs to the network chain 600 may be ciphertexts and the outputs may be plaintexts. Re-encryption can be replaced by decryption in some portion of the permutation/re-encryption steps.

An adversary is defined in this application as a player who controls some number of the users and mix servers. Users are those who post messages/ciphertexts to the bulletin board 400. Users may be personal computers, which may be operated by a person or persons. The adversary may attempt to compromise users and/or mix servers over whom the adversary does not exercise control to corrupt the correct functioning of the network chain 600 of FIG. 3. The adversary may seek to compromise user privacy by linking an output message (such as $E_4^3$) with an input message (such as $E_1^0$) or else cause an incorrect computation, e.g. one in which incorrect ciphertexts (such as an incorrect version of $E_4^3$) are output to the bulletin board 400.

The embodiment of the present invention described in FIGS. 2 through 5B has additional advantages as follows. Any player (where player is defined as a processor or computer which has read access and appenditive, sequential write access) can detect incorrect behavior on the part of any mix server (of 101, 201, and 301) in the network chain 600, by using information posted and stored in the memory of the bulletin board 400. The network chain 600 and the method in accordance with the present invention produces correct outputs (such as $E_1^3$, $E_2^3$, $E_3^3$, and $E_4^3$) if the mix servers in the chain 600 function correctly. The network chain 600 also conceals the permutation. That is it is infeasible for the adversary to determine whether a given output message (such as $E_4^3$) corresponds to a given input message such as $E_1^0$ with probability greater than that of a uniform random guess.

The embodiment of the present invention described with reference to FIGS. 2–5B may use two basic cryptographic primitives, El Gamal encryption (for the re-encryption steps of each randomizer such as randomizer 110), and the Schnorr identification protocol for the zero-knowledge proofs.

El Gamal encryption is generally known in the art and is generally disclosed in T. El Gamal. "A public key cryptosystem and a signature scheme based on discrete logarithms", *IEEE Transactions on Information Theory*, 31:469–472, 1985. El Gamal encryption generally works as follows. Let q be a large prime number (typically 160 bits long), and let p=Iq+1 be another large prime number (typically 1024 bits long). Let g be a generator of a subgroup of G Given a secret key $x \in Z_q$, we define the corresponding public key to be the pair (y, g) where $y=g^x$ mod p. (For this description, we shall implicitly assume computation in the multiplicative group $Z_p$ where applicable.) To encrypt a data message m (comprised of a plurality of data signals or data bits), we select an encryption exponent $\gamma \in_u Z_q$, where $\in_u$ denotes selection uniformly at random. The encryption consists of the pair $(+, \beta)=(my^\gamma, g^\gamma)$. To decrypt using the secret key x, we compute $m=\alpha/\beta x$. In the embodiments of the present invention the ciphertexts $E_1^0$, $E_2^0$, $E_3^0$, and $E_4^0$ shown in FIG. 2, would each be encrypted as "m" is encrypted in the description above except with different encryption parameters. (i.e. "re-encryption" is just a way of saying encrypt again using different parameters).

The critical property that we make use of in the El Gamal cipher is that of "semantic security" which is a term known in the art and disclosed in, *Handbook of Applied Cryptography*, CRC Press, 1996, A. J. Menezes, P. C. van Oorschot, and S. A. Vanstone. Intuitively, semantic security means that a ciphertext leaks no polynomial-time computable information about the corresponding plaintext. For our purposes, the most important consequence of this is that it is infeasible for an adversary to determine whether two ciphertexts encrypted under the same public key represent encryptions of the same plaintext. The El Gamal cipher is semantically secure under the Decision Diffie-Helman assumption. See "Security of ElGamal-based encryptions" in 1998 International Workshop on Practice and Theory in Public Key Cryptography (PKC '98), 1998 by Y. Tsiounis and M. Yung, for a proof of this property.

The property of semantic security enables a player (such as one of mix servers 100, 200, or 300 or a user not shown) with knowledge of the El Gamal public key y, but not necessary of the corresponding private key x, to re-encrypt a ciphertext $(\alpha, \beta)$. Suppose that $(\alpha, \beta)=(my^{r_1}, g^{r_1})$ for some plaintext m and encryption exponent r. The player selects re-encryption exponent $r \in Z_q$ uniformly at random, and computes $(\alpha', \beta')=(my^{r_1}x\ r^k, g^{r_1}x\ g^r)$ $(my^{r_2}, g\ r^2)$, where $r_2=r_1+r$. The semantic security of El Gamal means that it is infeasible for another player to determine whether $(\alpha, \beta)$ and $(\alpha', \beta')$ represent the same plaintext.

Another useful property of the El Gamal encryption algorithm is that of homomorphism. If ciphertext $(\alpha 1, \beta 1)$ represents plaintext $m_1$ and $(\alpha 2, \beta 2)$ represents plaintext $m_2$, then the plaintext $m_1 m_2$ can be computed simply as $(\alpha 1 \alpha 2, \beta 1 \beta 2)$. Similarly $(\alpha 1/\alpha 2, \beta 1/\beta 2)$ is an encryption of the plaintext $m_1/m_2$.

Schnorr identification can be the second basic tool of the embodiment of FIGS. 2 through 5B. The Schooner identification technique would also operate over $G_P$ as described above. The prover (such as mix server 101) holds a private key $x \in Z_q$. The corresponding public key is (Y, G), where $y=G^x$, and $G=g^k$, for some $k \in Z_q$. To prove possession of the private key, the prover (such as mix server 101) selects a value $e \in Z_q$ uniformly at random and sends a witness $w=G^e$ to the verifier (mix server 101 may send this to bulletin board 400 where the verifiers, such as mix servers 201 and 301 can access it). The verifier (one of mix servers 201 or 301 in this example) responds with a challenge c (by sending it to bulletin board 400 where it can be accessed by mix server 101), selected uniformly at random from $Z_q$. The prover (in this example, mix server 101) sends as a response the value s=xc+e (again to the bulletin board 400 of FIG. 4 which is then accessed by mix server 201 or 301). The identification protocol can be converted into a signature technique, the Schnorr signature technique, by letting c=h (w, m) for the message m to be signed. The prover (mix server 101) verifies that $G^3=wy^c$. For further details, generally on the Schnorr signature technique see, e.g., A. J. Menezes, P. C. van Oorschot, S. A. Vanstone, *Handbook of Applied Cryptography*, CRC Press, 1996.

Most of the computational cost of the embodiment of the present invention of FIGS. 2–5B derives from player proofs that randomizers (such as 110, 120, 130, 140, and 150 in FIG. 2; and others for other mix servers 201 and 301 not shown) are functioning properly. For this we use two proof protocols, called "DISPEP" and "PEP".

The protocol Plaintext Equivalence Proof called "PEP" enables a player (such as one of mix servers 101, 201 or 301) to prove that an El Gamal ciphertext $(\alpha, \beta)$ represents a re-encryption of El Gamal ciphertext $(\alpha', \beta')$. The protocol "DISPEP" which will be described later enables a player to prove that one of two El Gamal ciphertexts $(\alpha 1, \beta 1)$ and $(\alpha 2, \beta 2)$ represents a re-encryption of El Gamal ciphertext $(\alpha', \beta')$.

Let us suppose that a player (such as mix server 101) re-encrypts the El Gamal ciphertext $(\alpha, \beta)$ as $(\alpha', \beta')$ $(E_0^0=(\alpha, \beta)$, and one of $(E_0^{new}$ or $E_1^{new})=(\alpha', \beta')$ which are shown in FIG. 2.) In other words, for some plaintext m, the encryption $(\alpha, \beta)=(my^{k_1}, g^{k_1})$ and $(\alpha', \beta')=(my^{k_2}, g^{k_2})$ for some $k_1$, $k_2 \in Z_q$. The aim of "PEP" is for the player (in this example mix server 101) to use his knowledge of the re-encryption factor $k=k_2-k_1$, to prove that $(\alpha, \beta)$ and $(\alpha', \beta')$ represent the same plaintext.

We construct "PEP" using the homomorphism property of the El Gamal cipher. Observe, in particular, that if $(\alpha, \beta)$ and $(\alpha', \beta')$ represent the same plaintext, then $(\alpha/\alpha', \beta/\beta')$ represents an encryption of the plaintext value 1. Hence $\alpha/\alpha'=y^k$ and $\alpha/\alpha'=g^k$. We let $Y=(\alpha/\alpha')^{Z_1}(\beta/\beta')^{Z_2}$ and $G=y^{Z_2}g^{Z_1}$. Observe that $(\alpha/\alpha', \beta/\beta')$ may be regarded as a Schnorr public key $(Y, G)$ whose corresponding private key is the re-encryption factor k. The PEP algorithm is now implemented simply by having the prover (such as for example mix server 101) perform the Schnorr identification algorithm on the public key $(Y, G)$. Note that the protocol can be made interactive by having the prover (mix server 101) generate $z_1$ and $z_2$ using a hash function or pseudo-random function in an appropriate fashion and using the Schnorr signature algorithm instead of the identification algorithm.

The PEP algorithm is secure in the sense that it is infeasible for the prover (mix server 101 in this example) to convince the verifier (mix server 201 or 301) falsely of the equivalence of two plaintexts, and also in that it does not reveal significant information about the re-encryption factor k.

What we describe here is in fact a generalization of the Schnorr identification protocol. Typically G=g in standard implementations. Our generalization does not have any impact on the security of the algorithm.

An important technique which can be used in the embodiment of FIGS. 2–5B of the present invention is "disjunctive Schnorr identification protocol". This is a variant on the Schnorr identification algorithm in which, rather than performing the protocol with respect to some public key $(Y, G)$, the prover (such as mix server 101 of FIG. 3) uses one of two public keys, either $(Y_1, G_1)$ or $(y_2, G_2)$. The verifier (such as mix servers 201 and 301, in this example), however, while capable of verifying the correctness of the protocol, is incapable of determining any information about with respect to which of these two keys the prover (mix server 101) executed the protocol.

We first describe an interactive variant of this protocol, namely a disjunctive Schnorr identification protocol. Then we describe a non-interactive variant, namely a disjunctive Schnorr signature protocol. The disjunctive Schnorr identification algorithm works as follows. Let us assume without "w.l.o.g." i.e. without loss of quality that the prover (mix server 101 in this example) knows the secret $x_1=\log_{G_1} Y_1$ associated with the key pair $(Y_1, G_1)$. Further, let us assume that all operations take place in a large group G of known order m'. The prover (mix server 101) chooses $e_1$ and $S_2$ at random and also a k-bit challenge $c_2$. He computes $w_1=G_1^{e_1}$ and $w_2=G_2^{S_2}Y_2^{C_2}$, and sends these values to the verifier (to the bulletin board 400 which is then accessed by mix server 201 or 301). The verifier (mix server 201 or 301 in this example) picks a random k-bit challenge c and sends it to the prover (mix server 101). The prover (mix server 101) computes $c_1=C \oplus c_2$ (where $\oplus$ denotes the bitwise XOR operation) and $s1=e1-c1x$, and sends s1, s2, c1, and c2 to the verifier (to bulletin board 400 which is then accessed by mix servers 201 and 301). The verifier (mix server 201 or 301) checks that $Y_i^{c_i}=G_i^{s_i}w_i$ for i=1,2. In essence, the prover (mix server 101) can "cheat" on one of the two identification proofs exploiting the fact that it has one degree of freedom in its choice of challenges $c_1$ and $c_2$. This protocol enjoys the same zero knowledge properties as a conventional Schnorr proof. In particular, it is zero knowledge if k=O(log log m'), and, with use of commitments to enforce joint selection of a random challenge c can be made computational zero knowledge for k=O(poly(log m')). It is easy to see that the proof is sound in the sense that the prover (mix server 101) can only complete it successfully with knowledge of $x_1$ or $x_2$. This protocol may be made non-interactive or made into a signature algorithm by appropriate use of hash functions to replace the challenges. For further details, see R. Cramer, I Damggxd, and B. Schoemakers, "Proofs of partial knowledge and simplified design of witness hiding protocols", *In Advances in Cryptology-CRYPTO '94*, pages 174–187. Springer-Verlag, 1994. LNCS No. 839; and A. de Santis and L. di Crescenzo and G. Persiano and M. Yung, "On Monotone Formula Closure of SZK", *35th Annual Symposium on Foundations of Computer Science* (FOCS) 1994, pp. 454–465.

We do not make use of the disjunctive Schnorr identification or signature algorithms directly in the embodiment of FIGS. 2–5B of the present invention, but use one of them as a subroutine in the following building block.

The protocol Disjunctive plaintext equivalence proof called "DISPEP" enables a prover (mix server 101) to demonstrate that an El Gamal ciphertext $(\alpha, \beta)$ (which in this example corresponds to $E_1^{new}$ of FIG. 2) represents a re-encryption of one of two different El Gamal ciphertexts, $(\alpha 1, \beta 1)$ or $(\alpha 2, \beta 2)$ (i.e in FIG. 2, $E_1^0$ or $E_2^0$). We accomplish this by combining the protocol, "PEP" (previously described) with the disjunctive Schnorr identification algorithm (shown above) in the following manner. In particular, let $(Y_1, G_1)=(\alpha/\alpha 1)$ or $(\beta/\beta 1)$ and $(Y_2, G_2)=(\alpha/\alpha 2)$ or $(\beta/\beta 2)$. The protocol "DISPEP" involves the prover (mix server 101) performing a disjunctive Schnorr identification (or signature) technique with respect to the two public keys $(Y_1, G_1)$ and $(Y_2, G_2)$.

We shall make use of a final building block used by the verifier (mix servers 201 or 301) to check the multiple Schnorr proofs presented by the prover (mix server 101). We emphasize that this tool is not necessary for the security or robustness properties of the embodiment of the present invention in FIGS. 2–5B, but improves its efficiency considerably.

Batch Schnorr verification. Suppose a verifier (mix server 201 or 301) is presented with a set $\{w_i, c_i, s_i\}_{i=1}^k$ of purported non-interactive Schnorr proofs on public keys $\{Y_i, G_i\}_{i=1}^k$. The verifier can verify each proof individually by checking that $G_i^{s_i}=Y_i^{c_i}w_i$. To perform batch Schnorr verification, the verifier checks that $\prod_i G_i^{s_i}=\prod_i Y_i^{c_i}w_i$. Verification of this last equality may be accelerated considerably using the technique of simultaneous multiple exponentiation on the equality $\prod_i G_i^{s_i} \prod_i Y_i^{-c_i}=\prod_i W_i$.

Key sharing. The first step in a technique for an embodiment of the present invention of FIGS. 2–5B is for the players (i.e. mix servers 101, 201, and 301, and any users not shown) to generate a joint El Gamal public key pair (y, g), where y=gx. The private key x is shared additively. In other words, each mix server i holds share $x_i$ and $x=\Sigma_i x_i$. Additionally, each mix server (of mix servers 101, 201, and 301 of FIG. 4) performs secret sharing on its share $x_i$ using (n,[n/2])-Feldman VSS- (This must be done carefully, as in Canetti et al.) For further details, the reader is referred to the extensive literature on secret sharing protocols known in the art.

Input to the randomizer 110 is a pair of El Gamal ciphertexts $(\alpha 1, \beta 1)$ and $(\alpha 2, \beta 2)$ ($E_1^0$ and $E_2^0$, respectively) on respective plaintexts $m_1$ and $m_2$. Output consists of El Gamal ciphertexts ($\alpha1'$, $\beta1'$) and ($\alpha2'$, $\beta2'$) ($E_1^1$ and $E_2^1$, respectively) corresponding to respective plaintexts $m_1'$ and $m_2'$. After posting output to the bulletin board 400, the mix server 101 must prove that either $(m_1, m_2)=(m_1', m_2')$ or else $(m_1, m_2)=(m_2', m_1')$. To do this, it suffices for the mix server 101 to prove two equalities. These equalities, and the protocols for proving them, as follows:

Note that it would be possible to replace Equality 2 with a variant on Equality 1, namely $m_2=m_1'$ or $m_2=m_2'$. This variant, however, permits cheating in the case that $m_1=m_2$ over, it yields somewhat less efficient proofs.

Equality 1: $m_1=m_1'$ or $m_1=m_2'$

Equality 2: $m_1 m_2 = m_1' m_2'$

The mix server (such as mix server 101) demonstrates the Equality 1 to other mix servers (such as mix server 201 and 301) using DISPEP. For Equality 2, the mix server 101 uses the homomorphic properties of El Gamal to compute $E[m_1 m_2]=(\alpha1\alpha1, \beta1\beta1')$ and computes $E[m_1 m_2]$ analogously. He then invokes the "PEP" technique as described previously.

Mix servers in the embodiment of FIGS. 2–5B of the present invention agree in advance on a randomizer network architecture such as the structure shown in FIG. 2. Then mix server 101 takes the ciphertexts $E_1^0, E_2^0, E_3^0$, and $E_4^0$ posted to the bulletin board 400 and passes them through randomizer network 100, executing each randomizer in turn as previously described. The mix server 101 posts his equality proofs to the bulletin board 400, and all other mix servers (such as mix servers 201 and 301) verify them. If mix server 101 is functioning improperly, then a majority coalition of the remaining mix networks (such as 201 and 301) decrypt his secret key x, (which was shared among them at the beginning of the protocol), and remove him from the mix network chain 600 shown in FIG. 3. If mix server 101 produces verifiably correct output, then this is passed to mix server 201, who does the same. Each mix server i similarly has the randomizer network structure as in FIG. 2. The final mix server 301 posts his output to the bulletin board 400 completing the mix network operation.

We claim:

1. An apparatus comprised of:

a plurality of mix servers wherein each mix server includes a randomizer network;

wherein each randomizer network receives a plurality of input data messages and performs re-encryption and permutation operations on the plurality of input data messages to form a plurality of output data messages, wherein each one of the plurality of output data messages is a re-encrypted version of one of the plurality of input data messages;

wherein the randomizer networks of the plurality of mix servers are arranged in a chain so that the first randomizer network of the first mix server in the chain receives its plurality of input data messages and provides its plurality of output data messages to the next randomizer network of the following mix server in the chain;

and wherein any further randomizer networks of any further mix servers in the chain receive their plurality of input data messages from a preceding randomizer network of a preceding mix server and provide their plurality of output data messages to a following randomizer network of the following mix server in the chain;

and wherein each randomizer network is comprised of a plurality of randomizers including a first randomizer and a second randomizer, wherein each randomizer receives first and second input data messages and produces first and second output data messages, wherein the first randomizer of each randomizer network supplies at least one of its first and second output data messages to the second randomizer of each randomizer network, wherein each randomizer performs a random permutation operation such that the first output data message of each randomizer is a re-encryption of either the first or the second input data message of each randomizer and the second output data message of each randomizer is a re-encryption of the other input data message of each randomizer.

2. The apparatus of claim 1 further comprised of a bulletin board having computer memory;

wherein each mix server produces proof to the bulletin board that each randomizer of each randomizer network has re-encrypted and permuted in a proper manner such that:

each first output data message of each randomizer of each randomizer network is a re-encryption of either the first input data message or the second input data message of the corresponding randomizer of the corresponding randomizer network and each second output data message of each randomizer of each randomizer network is a re-encryption the other input data message of the corresponding randomizer of the corresponding randomizer network.

3. An apparatus comprised of:

a plurality of mix servers wherein each mix server includes a randomizer network;

wherein each randomizer network receives a plurality of input data messages and performs decryption and permutation operations on the plurality of input data messages to form a plurality of output data messages, wherein each one of the plurality of output data messages is a decrypted version of one of the plurality of input data messages;

wherein the randomizer networks of the plurality of mix servers are arranged in a chain so that the first randomizer network of the first mix server in the chain receives its plurality of input data messages and provides its plurality of output data messages to the next randomizer network of the following mix server in the chain;

and wherein any further randomizer networks of any further mix servers in the chain receive their plurality of input data messages from a preceding randomizer network of a preceding mix server and provide their plurality of output data messages to a following randomizer network of the following mix server in the chain;

and wherein each randomizer network is comprised of a plurality of randomizers including a first randomizer and a second randomizer, wherein each randomizer receives first and second input data messages and produces first and second output data messages, wherein the first randomizer of each randomizer network supplies at least one of its first and second output data messages to the second randomizer of each randomizer network, wherein each randomizer performs a random permutation operation such that the first output data message of each randomizer is a decryption of either the first or the second input data message of each randomizer and the second output data message of each randomizer is a decryption of the other input data message of each randomizer.

4. The apparatus of claim 3 further comprised of a bulletin board having computer memory;

wherein each mix server produces proof to the bulletin board that each randomizer of each randomizer network has decrypted and permuted in a proper manner such that:
  each first output data message of each randomizer of each randomizer network is a decryption of either the first input data message or the second input data message of the corresponding randomizer of the corresponding randomizer network and
  each second output data message of each randomizer of each randomizer network is a decryption of the input data message of the corresponding randomizer of the corresponding randomizer network.

5. An apparatus comprised of:

a first mix server;

the first mix server including a first randomizer network;

the first randomizer network comprised of first, second, third, fourth, and fifth randomizers, each randomizer having an input port comprised of two input lines and an output port comprised of two output lines;

wherein the first randomizer network first randomizer:
  receives a first randomizer network first randomizer first input data message on its first input line and a first randomizer network first randomizer second input data message on its second input line;

re-encrypts the first randomizer network first randomizer first input data message to form a first randomizer network first randomizer first re-encrypted data message and re-encrypts the first randomizer network first randomizer second input data message to form a first randomizer network first randomizer second re-encrypted data message;

and performs a permutation by outputting the first randomizer network first randomizer first re-encrypted data message on either the first output line or the second output line of the first randomizer network first randomizer and by outputting the first randomizer network first randomizer second re-encrypted data message on the other output line;

wherein the first randomizer network second randomizer:
  receives a first randomizer network second randomizer first input data message on its first input line and a first randomizer network second randomizer second input data message on its second input line;

re-encrypts the first randomizer network second randomizer first input data message to form a first randomizer network second randomizer first re-encrypted data message and re-encrypts the first randomizer network second randomizer second input data message to form a first randomizer network second randomizer second re-encrypted data message;

and performs a permutation by outputting the first randomizer network second randomizer first re-encrypted data message on either the first output line or the second output line of the first randomizer network second randomizer and by outputting the first randomizer network second randomizer second re-encrypted data message on the other output line;

wherein the first randomizer network third randomizer:
  receives a first randomizer network third randomizer first input data message on its first input line and a first randomizer network third randomizer second input data message on its second input line, wherein the first randomizer network third randomizer first input data message is one of the first randomizer network first randomizer first or second re-encrypted data messages, and the first randomizer network third randomizer second input data message is one of the first randomizer network second randomizer first or second re-encrypted data messages;

re-encrypts the first randomizer network third randomizer first input data message to form a first randomizer network third randomizer first re-encrypted data message and re-encrypts the first randomizer network third randomizer second input data message to form a first randomizer network third randomizer second re-encrypted data message;

and performs a permutation by outputting the third randomizer first re-encrypted data message on either the first output line or the second output line of the first randomizer network third randomizer and by outputting the first randomizer network third randomizer second re-encrypted data message on the other output line;

wherein the first randomizer network fourth randomizer:
  receives a first randomizer network fourth randomizer first input data message on its first input line and a first randomizer network fourth randomizer second input data message on its second input line, wherein the first randomizer network fourth randomizer first input data message is one of the first randomizer network first randomizer first or second re-encrypted data messages, and the first randomizer network fourth randomizer second input data message is one of the first randomizer network second randomizer first or second re-encrypted data messages;

re-encrypts the first randomizer network fourth randomizer first input data message to form a first randomizer network fourth randomizer first re-encrypted data message and re-encrypts the first randomizer network fourth randomizer second input data message to form a first randomizer network fourth randomizer second re-encrypted data message;

and wherein the first randomizer network fourth randomizer performs a permutation by outputting the first randomizer network fourth randomizer first re-encrypted data message on either the first output line or the second output line of the first randomizer network fourth randomizer and by outputting the first randomizer network fourth randomizer second re-encrypted data message on the other output line wherein the first randomizer network fifth randomizer:
  receives a first randomizer network fifth randomizer first input data message on its first input line and a first randomizer network fifth randomizer second input data message on its second input line, wherein the first randomizer network fifth randomizer first input data message is the first randomizer network third randomizer second re-encrypted data message, and the first randomizer network fifth randomizer second input data message is the first randomizer network fourth randomizer first re-encrypted data message;

re-encrypts the first randomizer network fifth randomizer first input data message to form a first randomizer network fifth randomizer first re-encrypted data message and re-encrypts the first randomizer network fifth randomizer second input data message to form a first randomizer network fifth randomizer second re-encrypted data message;

wherein the first randomizer network fifth randomizer performs a permutation by outputting the first randomizer network fifth randomizer first re-encrypted data message on either the first output line or the second output line of the first randomizer network fifth randomizer and by outputting the first randomizer network fifth randomizer second re-encrypted data message on the other output line; and wherein each permutation is random.

6. The apparatus of claim 5 further comprised of:

a second mix server;

the second mix server including a second randomizer network;

the second randomizer network comprised of first, second, third, fourth, and fifth randomizers, each randomizer having an input port comprised of two input lines and an output port comprised of two output lines;

wherein the second randomizer network first randomizer:

receives a second randomizer network first randomizer first input data message on its first input line and a second randomizer network first randomizer second input data message on its second input line;

re-encrypts the second randomizer network first randomizer first input data message to form a second randomizer network first randomizer first re-encrypted data message and re-encrypts the second randomizer network first randomizer second input data message to form a second randomizer network first randomizer second re-encrypted data message;

and performs a permutation by outputting the second randomizer network first randomizer first re-encrypted data message on either the first output line or the second output line of the second randomizer network first randomizer and by outputting the second randomizer network first randomizer second re-encrypted data message on the other output line;

wherein the second randomizer network second randomizer:

receives a second randomizer network second randomizer first input data message on its first input line and a second randomizer network second randomizer second input data message on its second input line;

re-encrypts the second randomizer network second randomizer first input data message to form a second randomizer network second randomizer first re-encrypted data message and re-encrypts the second randomizer network second randomizer second input data message to form a second randomizer network second randomizer second re-encrypted data message;

and performs a permutation by outputting the second randomizer network second randomizer first re-encrypted data message on either the first output line or the second output line of the second randomizer network second randomizer and by outputting the second randomizer network second randomizer second re-encrypted data message on the other output line;

wherein the second randomizer network third randomizer:

receives a second randomizer network third randomizer first input data message on its first input line and a second randomizer network third randomizer second input data message on its second input line, wherein the second randomizer network third randomizer first input data message is one of the second randomizer network first randomizer first or second re-encrypted data messages, and the second randomizer network third randomizer second input data message is one of the second randomizer network second randomizer first or second re-encrypted data messages;

re-encrypts the second randomizer network third randomizer first input data message to form a second randomizer network third randomizer first re-encrypted data message and re-encrypts the second randomizer network third randomizer second input data message to form a second randomizer network third randomizer second re-encrypted data message;

and performs a permutation by outputting the third randomizer first re-encrypted data message on either the first output line or the second output line of the second randomizer network third randomizer and by outputting the second randomizer network third randomizer second re-encrypted data message on the other output line;

wherein the second randomizer network fourth randomizer:

receives a second randomizer network fourth randomizer first input data message on its first input line and a second randomizer network fourth randomizer second input data message on its second input line, wherein the second randomizer network fourth randomizer first input data message is one of the second randomizer network first randomizer first or second re-encrypted data messages, and the second randomizer network fourth randomizer second input data message is one of the second randomizer network second randomizer first or second re-encrypted data messages;

re-encrypts the second randomizer network fourth randomizer first input data message to form a second randomizer network fourth randomizer first re-encrypted data message and re-encrypts the second randomizer network fourth randomizer second input data message to form a second randomizer network fourth randomizer second re-encrypted data message; and performs a permutation by outputting the second randomizer network fourth randomizer first re-encrypted data message on either the first output line or the second output line of the second randomizer network fourth randomizer and by outputting the second randomizer network fourth randomizer second re-encrypted data message on the other output line;

wherein the second randomizer network fifth randomizer:

receives a second randomizer network fifth randomizer first input data message on its first input line and a second randomizer network fifth randomizer second input data message on its second input line, wherein the second randomizer network fifth randomizer first input data message is the second randomizer network third randomizer second re-encrypted data message, and the second randomizer network fifth randomizer second input data message is the second randomizer network fourth randomizer first re-encrypted data messages;

re-encrypts the second randomizer network fifth randomizer first input data message to form a second randomizer network fifth randomizer first re-encrypted data message and re-encrypts the second randomizer network fifth randomizer second input data message to form a second randomizer network fifth randomizer second re-encrypted data message; and performs a permutation by outputting the second randomizer network fifth randomizer first re-encrypted data message on either the first output line or the second output line of the second randomizer network fifth randomizer and by outputting the second randomizer network fifth randomizer second re-encrypted data message on the other output line; and wherein each permutation is random.

7. The apparatus of claim 6 and further comprised of:

a plurality of further mix servers;

each of the plurality of further mix servers including a corresponding randomizer network;

each corresponding randomizer network comprised of first, second, third, fourth, and fifth randomizers, each randomizer having an input port comprised of two input lines and an output port comprised of two output lines;

wherein each corresponding randomizer network first randomizer:

receives a corresponding randomizer network first randomizer first input data message on its first input line and a corresponding randomizer network first randomizer second input data message on its second input line;

re-encrypts the corresponding randomizer network first randomizer first input data message to form a corresponding randomizer network first randomizer first re-encrypted data message and re-encrypts the corresponding randomizer network first randomizer second input data message to form a corresponding randomizer network first randomizer second re-encrypted data message;

and performs a permutation by outputting the corresponding randomizer network first randomizer first re-encrypted data message on either the first output line or the second output line of the corresponding randomizer network first randomizer and by outputting the corresponding randomizer network first randomizer second re-encrypted data message on either the second output line or the first output line of the corresponding randomizer network first randomizer, wherein the corresponding randomizer network first randomizer first re-encrypted data message is output on a different output line from the corresponding randomizer network first randomizer second re-encrypted data message;

wherein the corresponding randomizer network second randomizer:

receives a corresponding randomizer network second randomizer first input data message on its first input line and a corresponding randomizer network second randomizer second input data message on its second input line;

re-encrypts the corresponding randomizer network second randomizer first input data message to form a corresponding randomizer network second randomizer first re-encrypted data message and re-encrypts the corresponding randomizer network second randomizer second input data message to form a corresponding randomizer network second randomizer second re-encrypted data message;

and performs a permutation by outputting the corresponding randomizer network second randomizer first re-encrypted data message on either the first output line or the second output line of the corresponding randomizer network second randomizer and by outputting the corresponding randomizer network second randomizer second re-encrypted data message on either the second output line or the first output line of the corresponding randomizer network second randomizer, wherein the corresponding randomizer network second randomizer first re-encrypted data message is output on a different output line from the corresponding randomizer network second randomizer second re-encrypted data message;

wherein the corresponding randomizer network third randomizer:

receives a corresponding randomizer network third randomizer first input data message on its first input line and a corresponding randomizer network third randomizer second input data message on its second input line, wherein the corresponding randomizer network third randomizer first input data message is one of the corresponding randomizer network first randomizer first or second re-encrypted data messages, and the corresponding randomizer network third randomizer second input data message is one of the corresponding randomizer network second randomizer first or second re-encrypted data messages;

wherein the corresponding randomizer network third randomizer re-encrypts the corresponding randomizer network third randomizer first input data message to form a corresponding randomizer network third randomizer first re-encrypted data message and re-encrypts the corresponding randomizer network third randomizer second input data message to form a corresponding randomizer network third randomizer second re-encrypted data message;

and wherein the corresponding randomizer network third randomizer performs a permutation by outputting the third randomizer first re-encrypted data message on either the first output line or the second output line of the corresponding randomizer network third randomizer and by outputting the corresponding randomizer network third randomizer second re-encrypted data message on either the second output line or the first output line of the corresponding randomizer network third randomizer, wherein the corresponding randomizer network third randomizer first re-encrypted data message is output on a different output line from the corresponding randomizer network third randomizer second re-encrypted data message;

wherein the corresponding randomizer network fourth randomizer:

receives a corresponding randomizer network fourth randomizer first input data message on its first input line and a corresponding randomizer network fourth randomizer second input data message on its second input line, wherein the corresponding randomizer network fourth randomizer first input data message is one of the corresponding randomizer network first randomizer first or second re-encrypted data messages, and the corresponding randomizer network fourth randomizer second input data message is one of the corresponding randomizer network second randomizer first or second re-encrypted data messages;

wherein the corresponding randomizer network fourth randomizer re-encrypts the corresponding randomizer network fourth randomizer first input data message to form a corresponding randomizer network fourth randomizer first re-encrypted data message and re-encrypts the corresponding randomizer network fourth randomizer second input data message to form a corresponding randomizer network fourth randomizer second re-encrypted data message;

and wherein the corresponding randomizer network fourth randomizer performs a permutation by outputting the fourth randomizer first re-encrypted data message on either the first output line or the second output line of the corresponding randomizer network fourth randomizer and by outputting the corresponding randomizer network fourth randomizer second re-encrypted data message on either the second output line or the first output line of the corresponding randomizer network fourth randomizer, wherein the corresponding randomizer network fourth randomizer first re-encrypted data message is output on a different output line from the corresponding randomizer network fourth randomizer second re-encrypted data message;

and wherein the corresponding randomizer network fifth randomizer:

receives a corresponding randomizer network fifth randomizer first input data message on its first input line and a corresponding randomizer network fifth randomizer second input data message on its second input line, wherein the corresponding randomizer network fifth randomizer first input data message is the second re-encrypted data message of the corresponding randomizer network third randomizer, and the corresponding randomizer network fifth randomizer second input data message is the first re-encrypted data message of the corresponding randomizer network third randomizer;

wherein the corresponding randomizer network fifth randomizer re-encrypts the corresponding randomizer network fifth randomizer first input data message to form a corresponding randomizer network fifth randomizer first re-encrypted data message and re-encrypts the corresponding randomizer network fifth randomizer second input data message to form a corresponding randomizer network fifth randomizer second re-encrypted data message;

performs a permutation by outputting the corresponding randomizer network fifth randomizer first re-encrypted data message on either the first output line or the second output line of the corresponding randomizer network fifth randomizer and by outputting the corresponding randomizer network fifth randomizer second re-encrypted data message on either the second output line or the first output line of the corresponding randomizer network fifth randomizer, wherein the corresponding randomizer network fifth randomizer first re-encrypted data message is output on a different output line from the corresponding randomizer network fifth randomizer second re-encrypted data message; and wherein each permutation is random.

8. The apparatus of claim 5 further comprised of:

a bulletin board having computer memory;

wherein the first mix server provides proof to the bulletin board that:
the outputs on the first output lines of the first randomizer, second randomizer, third randomizer, fourth randomizer, and fifth randomizer of the first randomizer network, were derived from a re-encryption of either the input on the first input line or the input on the second input line of the respective randomizer; and the outputs on the second output lines of the first randomizer, second randomizer, third randomizer, fourth randomizer, and fifth randomizer of the first randomizer network, were derived from a re-encryption of either the input on the first input line or the input on the second input line of the respective randomizer.

9. The apparatus of claim 6 further comprised of:

a bulletin board having computer memory;

wherein the first mix server provides proof to the bulletin board that:
the outputs on the first output lines of the first randomizer, second randomizer, third randomizer, fourth randomizer, and fifth randomizer of the first randomizer network, were derived from a re-encryption of either the input on the first input line or the input on the second input line of the respective randomizer; and the outputs on the second output lines of the first randomizer, second randomizer, third randomizer, fourth randomizer, and fifth randomizer of the first randomizer network, were derived from a re-encryption of either the input on the first input line or the input on the second input line of the respective randomizer.

10. The apparatus of claim 7 further comprised of:

a bulletin board having computer memory;

wherein the first mix server provides proof to the bulletin board that:
the outputs on the first output lines of the first randomizer, second randomizer, third randomizer, fourth randomizer, and fifth randomizer of the first randomizer network, were derived from a re-encryption of either the input on the first input line or the input on the second input line of the respective randomizer; and the outputs on the second output lines of the first randomizer, second randomizer, third randomizer, fourth randomizer, and fifth randomizer of the first randomizer network, were derived from a re-encryption of either the input on the first input line or the input on the second input line of the respective randomizer.

11. The apparatus of claim 9 further wherein:

wherein the second mix server provides proof to the bulletin board that:
the outputs on the first output lines of the first randomizer, second randomizer, third randomizer, fourth randomizer, and fifth randomizer of the second randomizer network, were derived from a re-encryption of either the input on the first input line or the input on the second input line of the respective randomizer; and the outputs on the second output lines of the first randomizer, second randomizer, third randomizer, fourth randomizer, and fifth randomizer of the second randomizer network, were derived from a re-encryption of either the input on the first input line or the input on the second input line of the respective randomizer.

12. The apparatus of claim 10 further wherein:

wherein the second mix server provides proof to the bulletin board that:
the outputs on the first output lines of the first randomizer, second randomizer, third randomizer, fourth randomizer, and fifth randomizer of the second randomizer network, were derived from a re-encryption of either the input on the first input line or the input on the second input line of the respective randomizer; and the outputs on the second output lines of the first randomizer, second randomizer, third randomizer, fourth randomizer, and fifth randomizer of the second randomizer network, were derived from a re-encryption of either the input on the first input line or the input on the second input line of the respective randomizer.

13. The apparatus of claim 12 further wherein:

wherein the plurality of further mix servers provide proof to the bulletin board that:

the outputs on the first output lines of the first randomizer, second randomizer, third randomizer, fourth randomizer, and fifth randomizer of each of the plurality of further randomizer networks, were derived from a re-encryption of either the input on the first input line or the input on the second input line of the respective randomizer; and the outputs on the second output lines of the first randomizer, second randomizer, third randomizer, fourth randomizer, and fifth randomizer of each of the plurality of further randomizer networks, were derived from a re-encryption of either the input on the first input line or the input on the second input line of the respective randomizer.

14. The apparatus of claim 8 further comprised of:

wherein the first mix server provides proof to the bulletin board that:

the output on the first output line of the first randomizer network first randomizer was derived from a re-encryption of either the input on the first input line or the input on the second input line of the first randomizer network first randomizer by:

determining a first ratio which is the output on the first output line of the first randomizer network first randomizer divided by the input on the first input line of the first randomizer network first randomizer;

determining a second ratio which is the output on the first output line of the first randomizer network first randomizer divided by the input on the second input line of the first randomizer network first randomizer;

performing a disjunctive Schnorr signature technique with respect to the first and second ratios.

15. The apparatus of claim 9 further comprised of:

wherein the first mix server provides proof to the bulletin board that:

the output on the first output line of the first randomizer network first randomizer was derived from a re-encryption of either the input on the first input line or the input on the second input line of the first randomizer network first randomizer by:

determining a first ratio which is the output on the first output line of the first randomizer network first randomizer divided by the input on the first input line of the first randomizer network first randomizer;

determining a second ratio which is the output on the first output line of the first randomizer network first randomizer divided by the input on the second input line of the first randomizer network first randomizer;

performing a disjunctive Schnorr signature technique with respect to the first and second ratios to obtain a first disjunctive Schnorr signature result;

and wherein the second mix server accesses the bulletin board and thereby accesses the first disjunctive Schnorr signature result to verify that the output on the first output line of the first randomizer network first randomizer was derived from a re-encryption of either the input on the first input line or the input on the second input line of the first randomizer network first randomizer.

16. A method comprising the steps of:

receiving at least four input data messages comprised of first, second, third, and fourth input data messages;

providing a first randomizer network which subjects the first and second input data messages to a first permutation and first re-encryption operation to provide first and second output data messages subjects the third and fourth input data messages to a second permutation and a second re-encryption operation to provide third and fourth output data messages;

subjects either the first or the second output data message to a third permutation and a third re-encryption operation to provide a first modified output data message;

subjects either the first or the second output data message to a fourth permutation and a fourth re-encryption operation to provide a second modified output data message;

subjects either the third or the fourth output data message to a third permutation and a third re-encryption operation to provide a third modified output data message;

subjects either the third or the fourth output data message to a fourth permutation and a fourth re-encryption operation to provide a fourth modified output data message;

subjects the second modified output data message to a fifth permutation and a fifth re-encryption operation to provide a second further modified output data message; and subjects the third modified output data message to a fifth permutation and a fifth re-encryption operation to provide a third further modified output data message; and wherein each of the first, second, third, fourth, and fifth permutations are random.

17. The method of claim 16 and further comprising the steps of:

providing a second randomizer network, which follows the first randomizer network and which repeats the steps of the first randomizer network with the first modified output data message, the second and third further modified output data messages, and the fourth modified output data messages of the first randomizer network functioning as the four input data messages for the second randomizer network.

18. An apparatus comprised of:

a plurality of mix servers wherein each mix server includes a randomizer network;

wherein each randomizer network receives a plurality of input data messages and performs re-encryption and permutation operations on the plurality of input data messages to form a plurality of output data messages, wherein each one of the plurality of output data messages is a re-encrypted version of one of the plurality of input data messages;

wherein the randomizer networks of the plurality of mix servers are arranged in a chain so that the first randomizer network of the first mix server in the chain receives its plurality of input data messages and provides its plurality of output data messages to the next randomizer network of the following mix server in the chain;

and wherein any further randomizer networks of any further mix servers in the chain receive their plurality of input data messages from a preceding randomizer network of a preceding mix server and provide their plurality of output data messages to a following randomizer network of the following mix server in the chain;

and wherein each randomizer network is comprised of a plurality of randomizers; and wherein each of the permutation operations are random.

19. The apparatus of claim 18 wherein each randomizer receives a plurality of input data messages and produces a plurality of output data messages, wherein there is a one to one correspondence so that each output data message is a re-encryption of one of the input data messages, and the order of the output data messages is randomly permuted with respect to the order of their corresponding input data messages.

* * * * *